(12) United States Patent
Zand et al.

(10) Patent No.: US 11,729,040 B2
(45) Date of Patent: Aug. 15, 2023

(54) COARSE AND FINE COMPENSATION FOR FREQUENCY ERROR

(71) Applicant: Cypress Semiconductor Corporation, San Jose, CA (US)

(72) Inventors: Pouria Zand, Irvine, CA (US); Kiran Uln, Pleasanton, CA (US); James Wihardja, Tustin, CA (US); Yan Li, Morganville, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 127 days.

(21) Appl. No.: 17/484,058

(22) Filed: Sep. 24, 2021

(65) Prior Publication Data

US 2023/0097689 A1 Mar. 30, 2023

(51) Int. Cl.
| | |
|---|---|
| *H04L 27/26* | (2006.01) |
| *H04L 43/0864* | (2022.01) |
| *H04W 64/00* | (2009.01) |
| *G01S 1/68* | (2006.01) |

(52) U.S. Cl.
CPC .......... *H04L 27/2663* (2013.01); *G01S 1/685* (2013.01); *H04L 27/2659* (2013.01); *H04L 43/0864* (2013.01); *H04W 64/006* (2013.01)

(58) Field of Classification Search
CPC ............. H04L 27/2659; H04L 27/2663; H04L 43/0864; H04W 64/006; G01S 1/685
See application file for complete search history.

(56) References Cited

U.S. PATENT DOCUMENTS

| | | | | |
|---|---|---|---|---|
| 4,236,249 A | * | 11/1980 | Burger | ................ H04L 27/2272 375/330 |
| 6,573,799 B1 | * | 6/2003 | Akopian | ................ G01S 19/40 701/469 |
| 2009/0201084 A1 | * | 8/2009 | See | ........................ H03F 1/3282 330/51 |

* cited by examiner

*Primary Examiner* — David B Lugo

(57) ABSTRACT

Disclosed are techniques to compensate frequency systematic known error (FSKE) in reflector or initiator radios using a hybrid RF-digital approach in multi-carrier phase-based ranging. The hybrid RF-digital approach combines a coarse frequency compensation technique in the RF domain and a fine frequency compensation technique in the digital domain to remove the FSKE across all carrier frequencies from a device. The coarse frequency compensation performed in the RF domain may use a PLL to multiply the crystal frequency to arrive close to a target carrier frequency to compensate for a coarse portion of the known FSKE at the target frequency. The fine frequency compensation may use digital techniques to remove the remaining portion of the known FSKE not compensated by the RF. The hybrid approach reduces the number of fractional bits in the multiplier of the PLL when compared to an approach that uses only the RF-PLL to remove the FSKE.

20 Claims, 7 Drawing Sheets

US 11,729,040 B2

COARSE AND FINE COMPENSATION FOR FREQUENCY ERROR

TECHNICAL FIELD

This disclosure generally relates to technologies for positioning and ranging using short-range narrow-band wireless signals, and more particularly, to methods and systems to compensate for frequency errors in systems that provide sub-meter accuracy and secure distance measurements for positioning and ranging applications using narrow-band radios such as Bluetooth technologies.

BACKGROUND

Secured entry and access to personal properties and restricted areas is increasingly relying on the use of remote digital keys. One solution is Passive Entry Passive Start (PEPS) application that provides sub-meter accuracy and secure distance measurement for positioning a car key using narrow-band radios such as Bluetooth Low Energy (BLE) or IEEE 802.15.4. In one implementation of the PEPS application, a main hub and multiple sensors on a car measure the angles of arrival/directions of arrival (e.g., AoA/AoD in Bluetooth Core Specification 5.1) using phase-based ranging and received signal strength indicator (RSSI) information from a key to estimate the position of the key. However, to improve the ranging accuracy, PEPS applications may require the exchange of frequency error information between the main hub and the key, increasing complexity and overhead. It is desired to improve the accuracy and reduce the complexity of ranging and positioning remote digital keys when using PEPS or other ranging and positioning applications.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
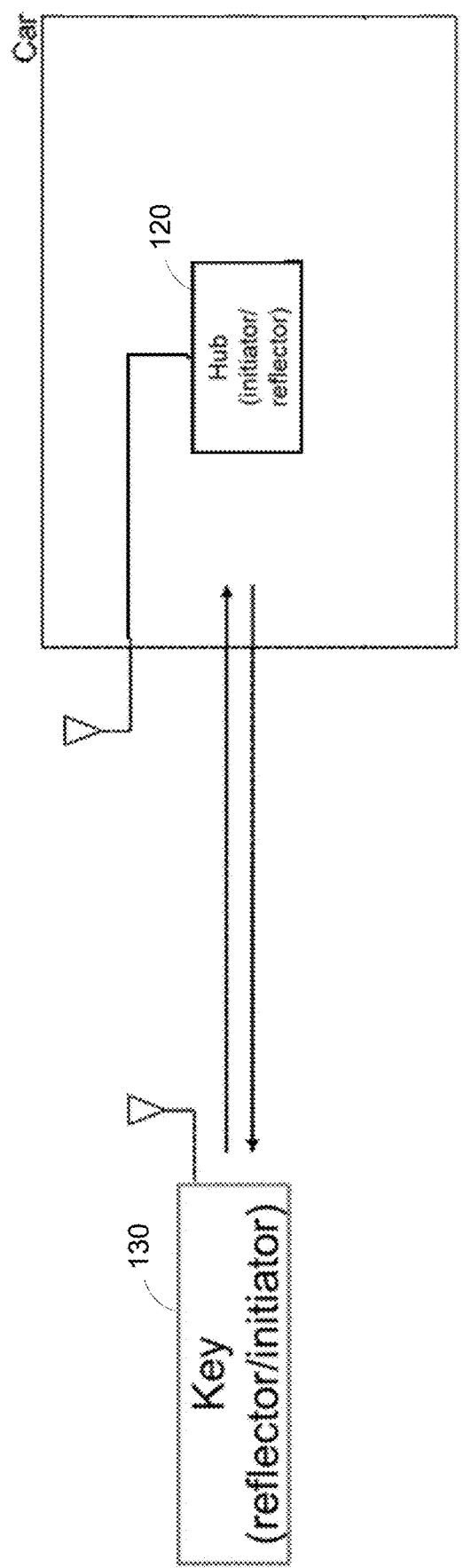
FIG. 1 is a block diagram that illustrates an application of secure phase-based ranging for car-key positioning, in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

One implementation of the PEPS application uses secure multi-carrier phase-based ranging for distance measurement and positioning, in which the two-way phase difference between two devices is measured over multiple carriers. In phase-based ranging, the two devices, the initiator and the reflector, exchange multiple constant tones (CT) over different carrier frequencies to mitigate multi-path fading and interference. The initiator is the device that initiates the ranging and the reflector is the device that responds to the initiator request. In applications using phase-based ranging for positioning a car key, the initiator (e.g., the main ranging device in the car) and the reflector (e.g., the key) may perform phase measurements on each other's CT. At the end of the multiple CT exchanges, the initiator and the reflector may exchange their phase measurement results to estimate the range and position of the key. PEPS applications require the ranging and positioning measurements to be secure against intruders such as man-in-the middle, phase manipulation, phase roll-over, and symbol level attacks.

To protect the phase-based ranging solutions using CT against the roll-over and phase manipulation attacks, the round-trip time (RTT) between the initiator and reflector devices may be measured by exchanging packets. For example, the initiator may send the CT or a RTT packet toward the reflector. In response, the reflector may send back its own CT or RTT packet toward the initiator. The distance between the two devices may be measured using both phase-based ranging and RTT techniques. As long as the difference in the estimated distance between the two measurements is less than a threshold (e.g., 3 meters), the phase-based ranging result may be deemed secure. In multi-carrier phase-based ranging and RTT operations, the ranging and positioning measurements may be repeated over multiple channels.

To improve the accuracy of the secure phase-based ranging, the initiator may estimate the relative frequency error between the initiator and the reflector so as to compensate for the relative frequency error and the relative timing error. The relative frequency error may include contributions from the relative crystal error between the initiator and the reflector and a crystal-independent term as shown in Equation 1:

$$f_{err,k} = f_k \left( \frac{ppm_r - ppm_i}{10^6} \right) + (FSKE_{r,k} - FSKE_{i,k}) \qquad \text{(Eq. 1)}$$

where $f_{err,k}$ is the relative frequency error as measured at carrier frequency $f_k$; $ppm_r$ is the crystal error of the reflector in part-per-million; $ppm_i$ is the crystal error of the initiator; $FSKE_{r,k}$ is the frequency systematic known error (FSKE) of the reflector at carrier frequency $f_k$; and $FSKE_{i,k}$ is the FSKE of the initiator at carrier frequency $f_k$. The FSKE is a known frequency error that a radio has while generating a known carrier frequency. The FSKE is independent of crystal accuracy. It means that, even if a device's crystal accuracy is 0 ppm, the carrier frequency may still have the FSKE error and the device may not or cannot fix the FSKE. The FSKE is a fixed value (per channel or carrier frequency) that does not change with environment variables such as temperature or voltage and it is the same value for the entire product samples.

As shown in Eq. 1, the initiator (or the reflector) may estimate the relative ppm $$\left(\frac{ppm_r - ppm_i}{10^6}\right)$$

based on the relative frequency error measurement at frequency $f_k$ ($f_{err,k}/f_k$), as long as both the reflector's FSKE ($FSKE_{r,k}$) and the initiator's FSKE ($FSKE_{i,k}$) at frequency $f_k$ are known. The initiator may use the estimated relative ppm to calculate the relative frequency error at another frequency based on knowledge of the reflector's and the initiator's FSKE at the other frequency. The initiator may then compensate for the relative frequency error and the relative timing error between the initiator and the reflector. Accordingly, in the secure phase-based ranging, the reflector with $FSKE_{r,k} \neq 0$, may inform the initiator of the entire table of $FSKE_{r,k}$ across all the carrier frequencies k=1 to n, before the initiator and the reflector start any ranging procedure. The reflector with $FSKE_{r,k} \neq 0$ may communicate its entire table upfront during a configuration phase. If the reflector supports $FSKE_{r,k}=0$ for all k, then it may drop that exchange, saving the pairing time and the communication overhead.

Described herein are various aspects of techniques to make the FSKE=0 (or close to 0) in reflector or initiator radios using a hybrid RF-digital approach in PEPS applications using multi-carrier phase-based ranging solutions. The hybrid RF-digital approach combines a coarse frequency compensation technique in the RF domain and a fine frequency compensation technique in the digital domain to remove the FSKE across all carrier frequencies at the reflector or initiator. The coarse frequency compensation performed in the RF domain may use a phase locked loop (PLL) to multiply the crystal frequency to arrive close to a target carrier frequency to compensate for a coarse portion of the known FSKE at the target carrier frequency. The fine frequency compensation may use digital techniques to remove the remaining portion of the known FSKE not compensated by the RF. The hybrid approach reduces the number of fractional bits in the multiplier of the PLL when compared to an approach that uses only the RF-PLL to remove the FSKE. By reducing the number of fractional bits in the multiplier of the PLL, the complexity, cost, and power consumption of the PLL is reduced.

In one aspect, the radio of the reflector or the initiator uses the coarse frequency compensation to come as close to the target carrier frequency as possible, as it reduces the analog bandwidth needed in the IF stages and reduces the overall frequency offsets. The fine frequency compensation in the digital domain may compensate any residual error using a digital mixer or a coordinate rotation digital computer (CORDIC). The resolution of the fine frequency compensation performed in the digital domain is almost unlimited and its dynamic range is only limited by the bandwidth of the analog (e.g., IF) chain. Advantageously, the hybrid approach lowers the communication overhead by eliminating the exchange of FSKE across all carrier frequencies during the configuration phase, reduces the complexity of the PLL and the RF, increases the overall performance of the radios, and simplifies the implementations of the initiator and the reflector.

FIG. 1 is a block diagram that illustrates an application of secure phase-based ranging for car-key positioning in accordance with one aspect of the present disclosure. A hub 120 is the main ranging device and may be an initiator of a ranging request to the key 130 or may be a reflector that responds to a ranging request from the key 130. Conversely, the key 130 may be a reflector that responds to the hub's 120 ranging request or may be an initiator of a ranging request to the hub 120. The hub 120 may perform phase sensing during the CT exchange or |ToD−ToA| (difference between time of arrival and time of departure) measurements during the RTT packet exchange. In one aspect, a host controller of the secure phase-based ranging system or an application may configure the hub 120 to perform the measurements.

Figure 2:
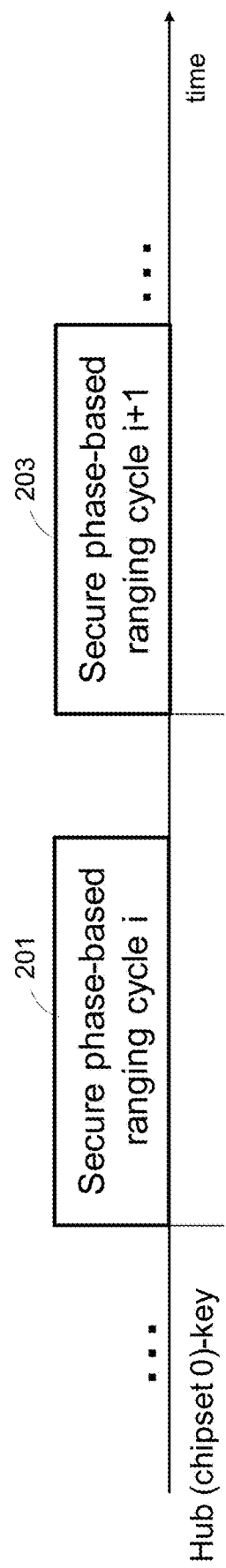
FIG. 2 illustrates multiple cycles of secure phase-based ranging for car-key positioning from the main hub in accordance with one aspect of the present disclosure.

FIG. 2 illustrates multiple cycles of secure phase-based ranging (e.g., ranging cycle i designated as 201 and ranging cycle i+1 designated as 203) for car-key positioning from the main hub in accordance with one aspect of the present disclosure. During each cycle (e.g., cycles 201 or 203), two desired devices, the initiator and the reflector, may exchange multiple CTs and RTT packets to perform the phase-based ranging and the RTT measurements to estimate the distance between the devices. The initiator may be the hub 120 in the car and the reflector may be the key 130, or vice versa. The cycles may be periodic or may be aperiodic.

Each cycle (e.g., cycles 201 or 203) may be divided into multiple timeslots. At the beginning of each cycle, in a calibration-synchronization timeslot, the hub and the key synchronize their timing and measure their frequency error offsets. In the discussion that follows, the hub and the key may be collectively referred to devices.

After the devices are time synchronized and the frequency error offsets measured, the hub and the key may be scheduled to perform the CT and RTT exchanges in subsequent timeslots in the cycle. At the beginning of each timeslot, the devices may switch to a new channel that will be used by the hub and the key for performing the CT and/or RTT exchanges in the timeslot. In one aspect, a host controller of the hub or an application in the car may perform the scheduling of the timeslots and channels of the cycles for the devices. During each scheduled timeslot for CT and RTT exchanges, the hub and the key may exchange only CT, only RTT packets, or a combination of CT and RTT packets.

In particular, before the secure phase-based ranging cycles, the host in the car may configure the initiator with an initial set of configuration parameters such as the cycles, timeslots, channels for the timeslots of the cycles, start times of the cycles/timeslots, etc. A host of the reflector in the key may also configure the reflector with its respective set of parameters. The initiator and the reflector may perform a handshaking and negotiation procedure to exchange their configuration parameters and security keys. The initiator and reflector may agree on a set of secure ranging parameters such as the channels for the timeslots of the cycles, start times of the cycles/timeslots, etc., that are tailored to the capabilities of the initiator and reflector.

The initiator and reflector may then start the scheduled timeslots of the cycles to exchange multiple CTs and RTT packets over multiple channels. At the end of a cycle, the initiator may send its phase measurements and |ToD−ToA| estimates to the host of the car. The reflector may send its phase measurements and |ToD−ToA| estimates to the host of the key. The host of the car and the host of the key may exchange their phase measurements and/or |ToD−ToA| estimates. For example, the phase measurements and/or |ToD−ToA| estimates from the key may be used as correction terms by the host of the car. The host of the car may use the received phase measurements from the initiator and key, and the |ToD−ToA| estimates from the initiator and the key, over multiple cycles to generate an accuracy estimate of the range and the position of the key.

Figure 3:
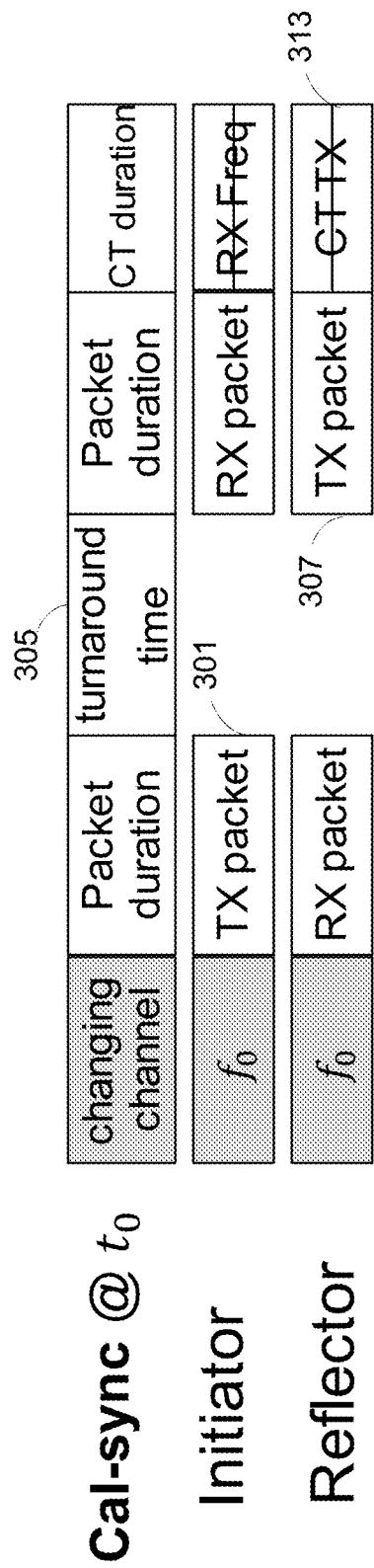
FIG. 3 illustrates the states in a calibration-synchronization timeslot of a secure phase-based ranging cycle for the devices in accordance with one aspect of the present disclosure.

FIG. 3 illustrates the states in a calibration-synchronization timeslot of a secure phase-based ranging cycle for the devices in accordance with one aspect of the present disclosure. At the beginning of the cycle at timeslot to, the initiator and the reflector synchronize their timing references when the initiator first sends a packet 301, and after the turnaround time (Tx-to-Rx for the initiator and Rx-to-Tx for the reflector) 305, the reflector sends back a packet 307. Following timing reference synchronization among the devices, the reflector transmits a CT 313 for the initiator to measure their relative frequency error. The initiator and the reflector may perform the calibration and synchronization using a known or agreed channel. Based on the measured relative frequency error and knowledge of the relative FSKE at the known or agreed channel, the initiator may estimate the relative ppm as discussed in Eq. 1 and may estimate the relative frequency errors for other channels based on the relative ppm and knowledge of the reflector's and the initiator's FSKE for the other channels. The initiator may then compensate for the relative frequency errors and the relative timing errors across the range of possible channels. Following the calibration-synchronization timeslot, the initiator and the reflector may perform the CT and RTT exchanges in subsequent timeslots of the cycle using a different channel in each timeslot.

To eliminate the overhead of the reflector communicating its FSKE table to the initiator during a configuration phase before the ranging timeslots of the cycle, the reflector (or the initiator) may generate carrier frequencies with the FSKE set to zero (or close to zero, for example <10 Hz) for all the channels. The reflector may store its FSKE for all the channels (e.g., 80 channels in 2.4 GHz) in a table. If the FSKE has a resolution in Hz and a maximum bound of ±10 KHz, each entry in the table representing the FSKE for a channel may need 15 bits, or 2 bytes if rounded up. To communicate the entire FSKE table of 80 channels would have required 160 bytes of data throughput. By making the FSKE=0 for all the channels of the reflector (or the initiator), the pairing time and the communication overhead during the configuration phase is reduced or eliminated.

In one aspect, the reflector or the initiator may use a hybrid RF-digital technique combining coarse frequency compensation in RF and fine frequency compensation in the digital domain to remove the FSKE from the channels. The coarse frequency compensation in RF may use a PLL to multiply the crystal frequency to arrive close to a target carrier frequency of a channel to compensate for a coarse portion of the FSKE at the channel. The multiplier of the PLL may have an integer (N) and a fractional (K) portion. The fractional portion is expensive to implement and power hungry. It also has limited resolution due to possible noise shaping needed to optimize the phase noise. As such, it is desirable to keep the fractional portion of the PLL in as few bits as possible to generate a coarse frequency compensation, but having enough bits for the PLL to arrive close to the target carrier frequency of the channel to reduce the analog bandwidth needed in the IF stages and to reduce the overall frequency offsets. The fine frequency compensation in the digital domain may compensate any residual error using a digital mixer or a coordinate rotation digital computer (CORDIC). The resolution of the fine frequency compensation performed in the digital domain is almost unlimited and its dynamic range is only limited by the bandwidth of the analog (e.g., IF) chain.

As an example, assume the radio is to generate a target carrier frequency of 2402 MHz, using a 19.2 MHz crystal in order to transmit a signal of 1 MHz bandwidth through a 1.5 MHz IF bandwidth centered at 4 MHz IF. Assume also that the target frequency error after compensating for FSKE is bounded to ±10 Hz as it is desirable to have sub-10 Hz error for applications like phase-based ranging. As the IF frequency is set to 4 MHz, the frequency of the local oscillator (LO) is set to 2402−4=2398 MHz. If only the PLL in the RF was used to generate the carrier frequency with the frequency error less than ±10 Hz, then the integer (N) of the PLL multiplier is 124 (2398/19.2) and the fractional portion (K) would need to be 20 bits, which is impractical and expensive.

However, using the hybrid RF-digital technique to compensate the FSKE, the bit-width of the fractional portion (K) may be reduced. For example, the IF bandwidth having a margin of 0.25 MHz on either side of the signal bandwidth may be used to effectively "shift" the signal in the digital domain and to accommodate possible residual errors in the RF PLL generation. The radio may implement coarse frequency compensation by setting N=124 in RF and setting K to be 16 bits, yielding a frequency error of ~97.65 Hz. Combined with the fine frequency compensation using the digital mixer or the CORDIC to shift the signal by −97.65 Hz, the target carrier frequency with the target error may be achieved with significantly fewer bits in the PLL of the RF domain, reducing complexity, area, and power, and increasing robustness of the design to accommodate different frequency errors across the frequency bands.

In one aspect, the reflector and the initiator's Link Layer (e.g., firmware) may keep the local frequency compensation table for the entire bandwidth (e.g., 80 channels in 2.4 GHz). In one aspect, for each channel, the local frequency compensation may be calculated as $$\left(\frac{f_{IF} - FSKE_k}{f_{s_k}}\right),$$

where $f_{IF}$ is the IF frequency, $f_{s_k}$ is the sampling frequency for channel k and $FSKE_k$ is the frequency actuation error for channel k. In one aspect, if the fine frequency compensation operates on un-modulated IF carrier or the IF carrier is modulated with the signal, the local frequency compensation may be calculated as $$\left(-\frac{FSKE_k}{f_{s_k}}\right).$$

The local frequency compensation for a channel may represent the fine frequency compensation used by the digital mixer or the CORDIC to frequency shift the signal to compensate for the FSKE for the channel. In one aspect, if a portion of the FSKE is compensated in the digital domain and the remaining portion is compensated in RF, the local frequency compensation for a channel may represent the portion of the FSKE to be compensated in the digital domain using the digital mixer or the CORDIC.

In one aspect, the $FSKE_k$ may be measured in the lab per channel. In each channel, first the total frequency error and crystal oscillators error are measured. The total frequency error and the crystal oscillators error (e.g., ppm) may be measured concurrently. Once these two errors are measured, then the frequency error due to the crystal oscillators error may be excluded from the total frequency error to generate the $FSKE_k$ for the channel. The radio may store the $FSKE_k$ for each channel in a FSKE table. In one aspect, a portion of the $FSKE_k$ to be compensated digitally may be stored in the local frequency compensation table as discussed. In one aspect, to reduce the amount of memory (e.g., read-only memory or ROM) used to store the table, the radio may factor out or subtract a term common to all the $FSKE_k$, such as a common denominator or a common bias, from the $FSKE_k$ and may store the resulting $FSKE_k$ in the table using a lower number of bits. For example, instead of allocating 32 bits for every $FSKE_k$ in the table, the radio may allocate 16 bits after removing a common term. The radio may restore the correct $FSKE_k$ by multiplying or adding the common term to the 16 bit value in the table to generate the desired 32 bit $FSKE_k$ value before compensating for it using the hybrid RF-digital frequency compensation technique.

In one aspect, at the beginning of each phase measurement timeslot (e.g., during the frequency change period), before transmitting the constant tone, the Link Layer or the PHY layer in the reflector (and the initiator) may program the digital fine adjustment for the channel based on the local frequency compensation table. In one aspect, the device may allocate a portion of the FSKE to be compensated using the coarse frequency compensation in RF and a remaining portion of the FSKE to be compensated using the fine frequency compensation in the digital domain. As such, the Link Layer or the PHY may also program the PLL to set the LO for the coarse frequency compensation in RF during the frequency change period. In one aspect, the entire FSKE to be compensated may be allocated to the digital fine frequency compensation. In each timeslot, once the modem receives the compensation value, it may adjust the IF frequency or the baseband signal with the programmed frequency offset using the digital mixer or the CORDIC. The RF may then perform the coarse frequency compensation by shifting the digitally compensated IF signal using a local oscillator (LO) frequency generated using the PLL to arrive at the target carrier frequencies with FSKE=0 for the reflector (i.e., $FSKE_{r,k}$=0). As a result, the frequency error measurement in the initiator will be:

$$f_{err,k} = f_k\left(\frac{ppm_r - ppm_i}{10^6}\right) + (FSKE_{r,k} - FSKE_{i,k}) \Rightarrow f_{err,k} = f_k\left(\frac{ppm_r - ppm_i}{10^6}\right) + (FSKE_{i,k}) \quad \text{(Eq. 2)}$$

where the $FSKE_{i,k}$ is known by the initiator.

Similarly, in the initiator, the Link Layer or the PHY layer may perform the local compensation for the known FSKE in the initiator (i.e., $FSKE_{i,k}$). At the beginning of each phase measurement timeslot, before transmitting the constant tone, the Link Layer or the PHY layer in the initiator may program the digital fine adjustment for the channel based on the local frequency compensation table. As a result, the initiator may perform calculation for relative the frequency error as:

$$f_{err,k} = f_k\left(\frac{ppm_r - ppm_i}{10^6}\right) + (FSKE_{i,k}) \Rightarrow f_{err,k} = f_k\left(\frac{ppm_r - ppm_i}{10^6}\right) \quad \text{(Eq. 3)}$$

Figure 4:
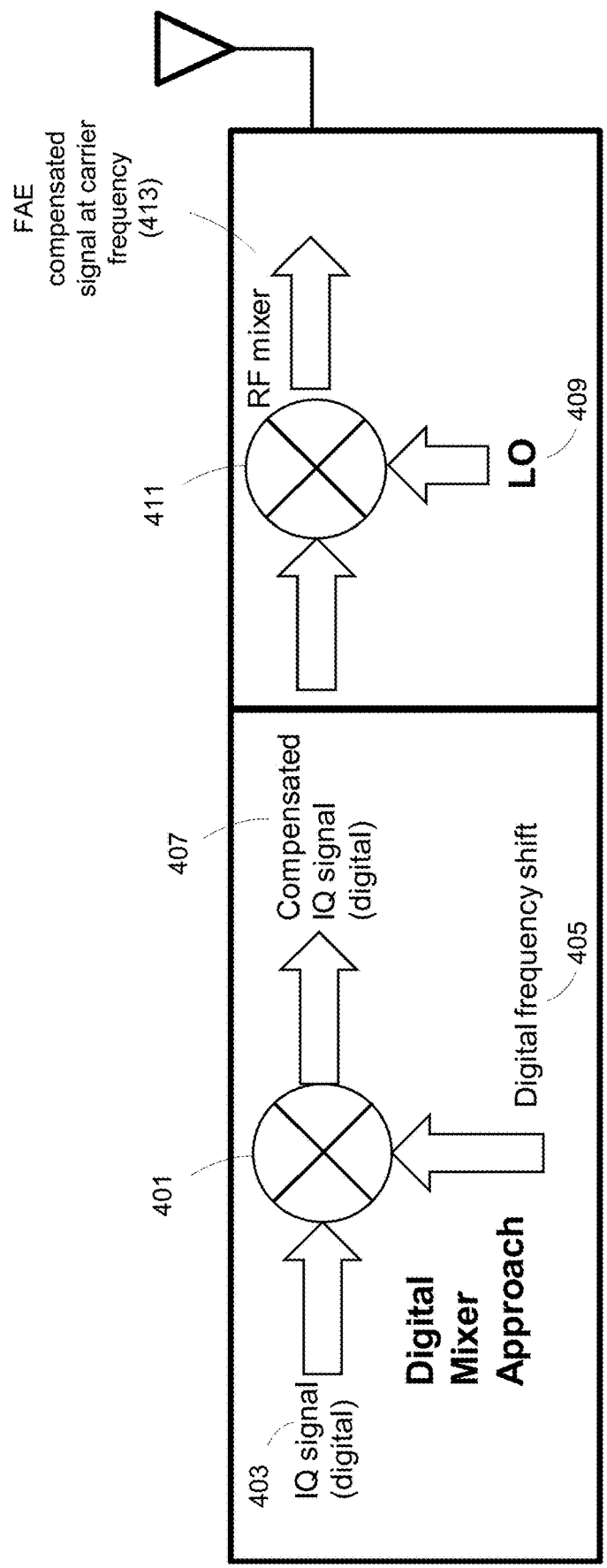
FIG. 4 illustrates a functional block diagram for using the RF coarse frequency compensation in conjunction with using a digital mixer for fine frequency compensation to remove the FSKE in accordance with one aspect of the present disclosure.

FIG. 4 illustrates a functional block diagram for using the RF coarse frequency compensation in conjunction with using a digital mixer 401 for fine frequency compensation to remove the FSKE in accordance with one aspect of the present disclosure. The digital mixer 401 may mix a digital IQ signal 403 with a digital frequency shift 405. For example, digital IQ signal 403 may represent a CT signal at the IF frequency $f_{IF}$ or data of a RTT packet centered at $f_{IF}$. Digital frequency shift 405 may represent a fine portion of the $FSKE_k$ ($FSKE_{fine,k}$) to be compensated and may be set to be the negative of $FSKE_{fine,k}$ or $-FSKE_{fine,k}$ In one aspect, $FSKE_k$, the FSKE for channel k, may be represented as a sum of $FSKE_{fine,k}$ and $FSKE_{coarse,k}$ (a coarse portion of the $FSKE_k$). $FAE_{fine,k}$ may be allocated to be compensated using the digital mixer 401 and $FSKE_{coarse,k}$ may be allocated to be compensated using the RF coarse frequency compensation. Digital mixer 401 may multiply digital IQ signal 403 with digital frequency shift 405 represented in IQ format to generate the compensated digital IQ signal 407. In the above example of the digital IQ signal 403 at $f_{IF}$ and the digital frequency shift 405 at $-FSKE_{fine,k}$, the compensated digital IQ signal 407 may be at IF frequency ($f_{IF}-FSKE_{fine,k}$).

The RF coarse frequency compensation circuit may use an RF mixer 411 to mix the compensated digital IQ signal 407 that has been converted into an analog signal with an LO signal 409 generated from the PLL in the RF domain. As mentioned, LO signal 409 may include a coarse portion of the $FSKE_k$ ($FSKE_{coarse,k}$) to be compensated using the RF mixer 411. The output from the RF mixer 411 may be denoted as FSKE compensated signal at carrier frequency 413. Continuing with the previous example, LO signal 409 may be at ($f_k-f_{IF}-FSKE_{coarse,k}$), where $f_k$ represents the carrier frequency for channel k. The FSKE compensated signal at carrier frequency 413 may be at RF frequency ($f_k-FSKE_{fine,k}-FSKE_{coarse,k}$) or ($f_k-FSKE_k$). If the radio has a FSKE of $FSKE_k$ when generating $f_k$, the FSKE compensated signal at carrier frequency 413 transmitted from the radio may be at the target carrier frequency of $f_k$ with no FSKE.

Figure 5:
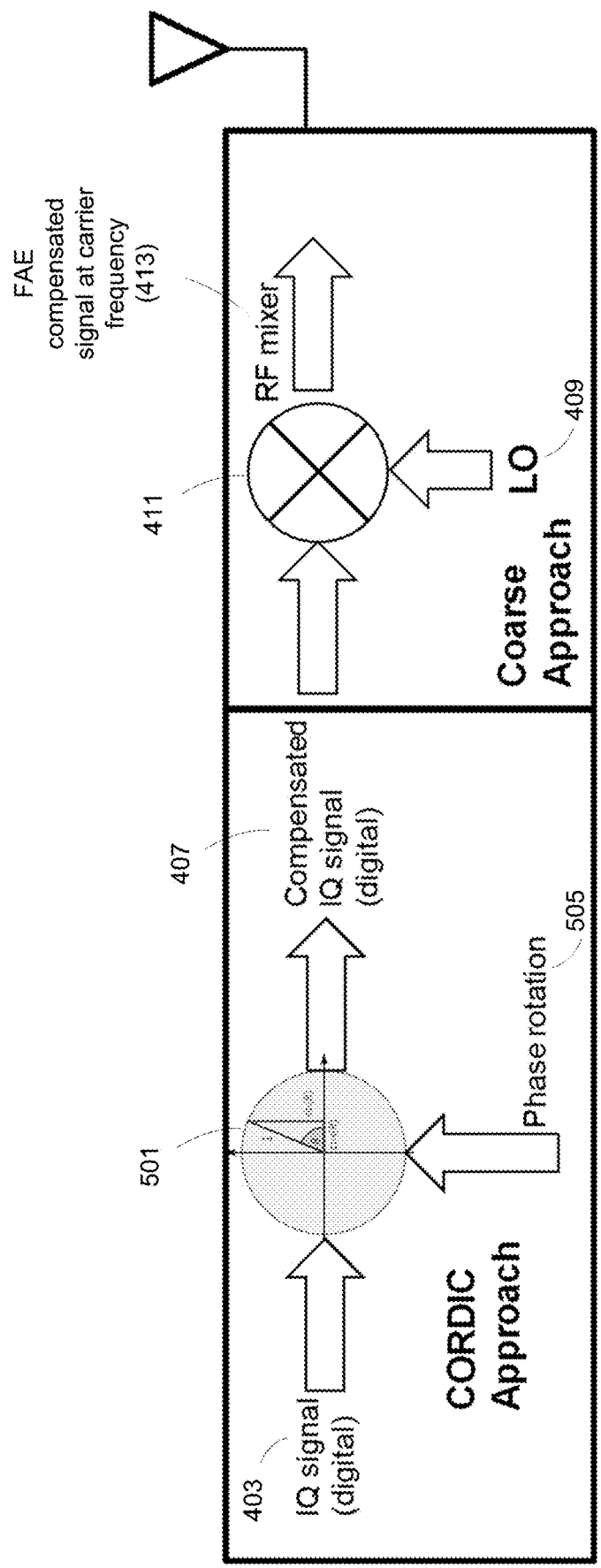
FIG. 5 illustrates a functional block diagram for using the RF coarse frequency compensation in conjunction with using a CORDIC for fine frequency compensation to remove the FSKE in accordance with one aspect of the present disclosure.

FIG. 5 illustrates a functional block diagram for using the RF coarse frequency compensation in conjunction with using a CORDIC 501 for fine frequency compensation to remove the FSKE in accordance with one aspect of the present disclosure. The CORDIC 501 may mix a digital IQ signal 403 with a phase rotation signal 505 to perform the frequency shift. The phase rotation signal 505 may represent the digital frequency shift 405 of FIG. 4 in the phase-magnitude format. To facilitate the coordinate rotation, the CORDIC 501 may convert the digital IQ signal 403 also into phase-magnitude format so that the phase of the digital IQ signal 403 may be summed with the phase of the phase rotation signal 505 and the magnitude of the digital IQ digital 403 may be multiplied with the magnitude of the phase rotation signal 505. The CORDIC may convert the result of the frequency shift back to quadrature IQ format.

The RF coarse frequency compensation circuit may operate the same way as in FIG. 4 to mix the compensated digital IQ signal 407 that has been converted into an analog signal with the LO signal 409 generated from the PLL in the RF domain. The implementations of FIG. 4 and FIG. 5 give the same results but may differ in area, cost, and complexity depending on the number of bits of the digital IQ signal 407, the number of bits of the FSKE to be compensated, and the desired number of bits of the compensated digital IQ signal 407.

Figure 6:
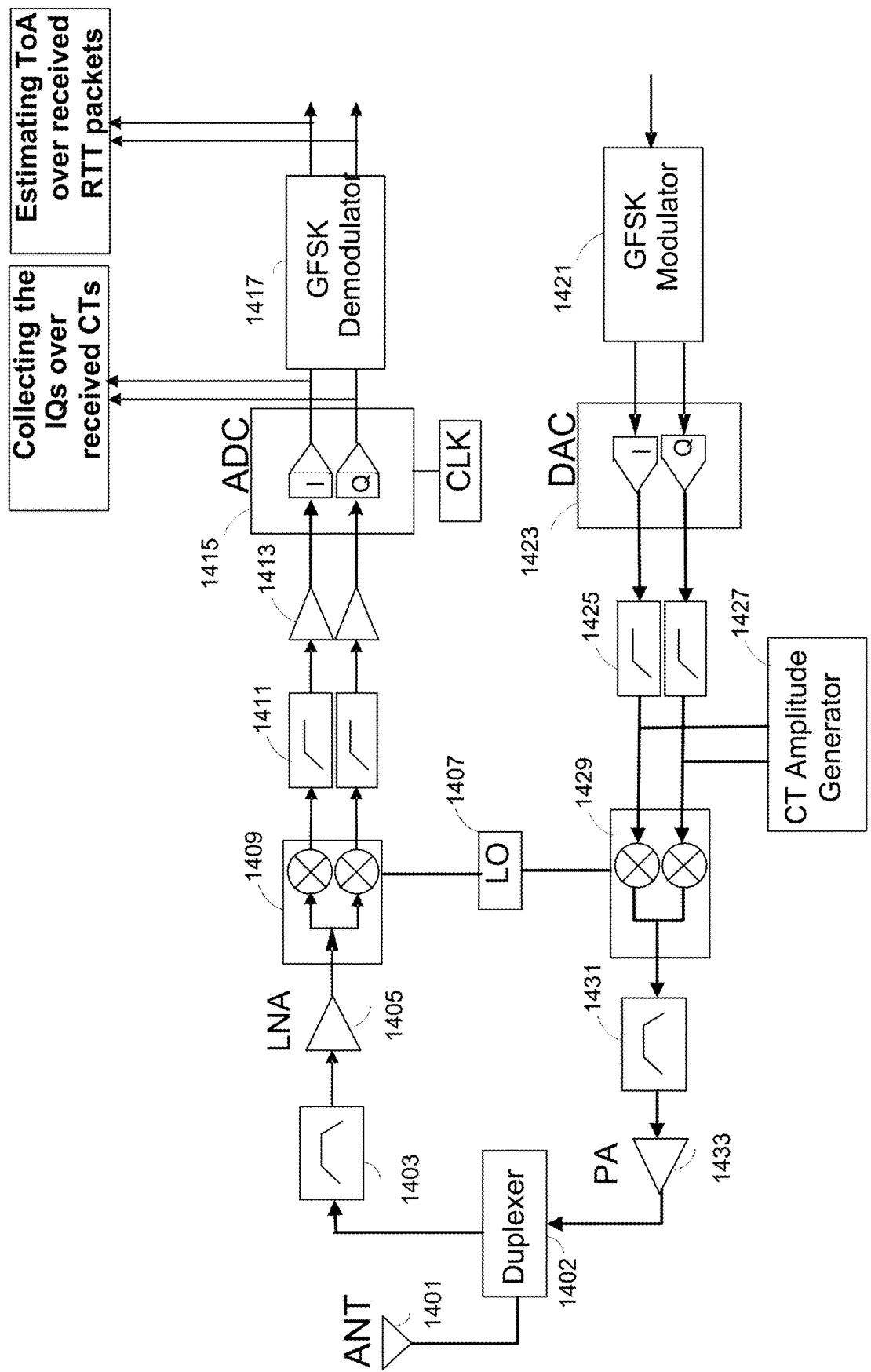
FIG. 6 illustrates a functional block diagram of a chipset that implements secure phase-based ranging cycles, in accordance with one aspect of the present disclosure.

FIG. 6 illustrates a functional block diagram of a chipset that implements secure phase-based ranging cycles, in accordance with one aspect of the present disclosure.

The chipset may receive a BLE signal containing a CT for phase measurements or a Gaussian frequency shift keying (GFSK) modulated RTT packet for ToA estimates during the CT or RTT packet exchange between the initiator and reflector, respectively. An antenna 1401 may receive the BLE signal. A duplexer may provide isolation between the received BLE signal and a transmit BLE signal path. A bandpass filter 1403 centered at the channel of the received signal may filter the receive signal to generate a bandpass signal containing the RTT packet or the CT. A low noise amplifier (LNA) 1405 may amplify the bandpass signal. A downconverter 1409 may mix the amplified bandpass signal with a local oscillator (LO) 1407 tuned to the center frequency of the channel to generate a downconverted quadrature signal. A low pass filter 1411 may filter the downconverted quadrature signal to generate a baseband quadrature signal. An amplifier 1413 may amplify the baseband quadrature signal to generate an amplified baseband quadrature signal. An analog-to-digital converter (ADC) 1415 may sample the amplified baseband quadrature signal with a sampling clock to generate a digital baseband quadrature signal. If the BLE received signal is a CT signal, the digital baseband quadrature signal may represent the quadrature samples of the CT signal. If the received signal is a RTT packet, a GFSK demodulator 1417 may demodulate the digital baseband quadrature signal to recover the RTT packet and to estimate the ToA of the RTT packet.

When configured as a transmitter, the chipset may transmit a GFSK modulated RTT packet signal or a CT signal. A GFSK 1421 modulator may generate a GFSK modulated RTT packet signal in baseband in the digital domain. A digital-to-analog converter (DAC) 1423 may convert the GFSK modulated RTT packet signal from the digital domain to an analog representation. A lowpass filter 1425 may filter the analog GFSK modulated RTT packet signal to generate a baseband RTT packet signal. An upconverter 1429 may mix the baseband RTT packet signal with the LO 1407 tuned to the adjacent channel to generate an upconverted RTT packet signal centered at the adjacent channel. If the adjacent signal transmission is for a CT signal, the upconverter 1429 may mix an amplitude output from a CT amplitude generator 1427 with the adjacent channel carrier frequency of the LO 1407 to generate an upconverted CT signal at the adjacent channel. A bandpass filter 1431 centered at the adjacent channel may filter the upconverted RTT packet signal or the upconverted CT signal to generate a bandpass signal. A power amplifier (PA) 1433 may amplify the bandpass signal to generate a BLE transmit signal. The duplexer 1402 may supply the BLE transmit signal to the antenna 1401 for transmission.

Figure 7:
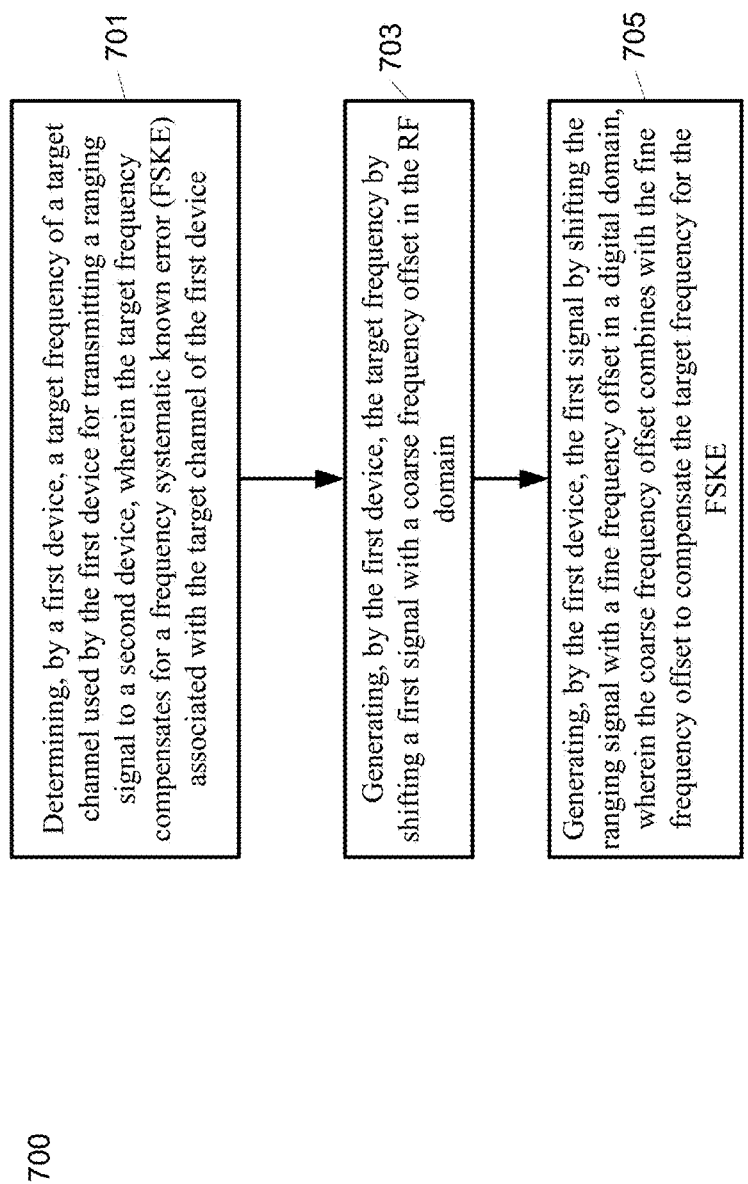
FIG. 7 illustrates a flow diagram of a method 700 for using a combination of a coarse frequency compensation in RF and a fine frequency compensation in the digital domain to compensate the FSKE at the reflector or the initiator for multi-carrier phase-based ranging, in accordance with one aspect of the present disclosure.

FIG. 7 illustrates a flow diagram of a method 700 for using a combination of a coarse frequency compensation in RF and a fine frequency compensation in the digital domain to compensate the FSKE at the reflector or the initiator for multi-carrier phase-based ranging, in accordance with one aspect of the present disclosure. In one aspect, the method 700 may be performed by the chipset or the functional block diagram of FIG. 1-6 utilizing hardware, software, or combinations of hardware and software.

In operation 701, a first device determines a target frequency of a target channel used by the first device for transmitting a ranging signal to a second device. The target frequency compensates for the FSKE associated with the target channel of the first device. In one aspect, the FSKE may be measured and stored in a table for different target channels. A portion of the FSKE may be compensated from the target frequency using coarse frequency compensation in RF and a remaining portion may be compensated using fine frequency compensation in the digital domain.

In operation 703, the first device generates the target frequency by shifting a first signal with a coarse frequency offset in the RF domain. In one aspect, an RF mixer may mix the first signal with a local oscillator generated based on the target frequency and the portion of the FSKE allocated for coarse frequency compensation. The first signal may have an IF that is compensated based on the portion of the FSKE allocated for fine frequency compensation.

In operation 705, the first device generates the first signal by shifting the ranging signal with a fine frequency offset in a digital domain. In one aspect, a digital mixer or a CORDIC may mix the ranging signal with a digital frequency shift generated based on the IF and the portion of the FSKE allocated for fine frequency compensation. The fine frequency compensation may remove the remaining portion of the FSKE not compensated by the RF. The compensation of the coarse frequency offset performed in the RF domain combines with the compensation of the fine frequency offset performed in the digital domain to generate the target frequency that is compensated for the FSKE of the target channel.

Various embodiments of the multi-carrier phase-based ranging system described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for ranging between two devices, comprising:
   determining, by a first device, a target frequency of a target channel used by the first device for transmitting a ranging signal to a second device, wherein the target frequency compensates for a frequency systematic known error (FSKE) associated with the target channel of the first device;
   generating, by the first device, the target frequency by shifting a first signal with a coarse frequency offset in a radio frequency (RF) domain; and
   generating, by the first device, the first signal by shifting the ranging signal with a fine frequency offset in a digital domain, wherein the coarse frequency offset combines with the fine frequency offset to compensate the target frequency for the FSKE.

2. The method of claim 1, further comprising:
   determining, by the first device, the coarse frequency offset and the fine frequency offset based on the FSKE associated with the target channel of the first device.

3. The method of claim 1, wherein generating the target frequency by shifting the first signal with the coarse frequency offset in the RF domain comprises:
   configuring, by the first device, a phase locked loop (PLL) to generate the coarse frequency offset, wherein a frequency resolution of the PLL yields a frequency error in the coarse frequency offset that fails to fully compensate the target frequency for the FSKE.

4. The method of claim 3, wherein the fine frequency offset in the digital domain compensates for the frequency error in the coarse frequency offset in the RF domain to fully compensate the target frequency for the FSKE.

5. The method of claim 1, wherein generating the first signal by shifting the ranging signal with the fine frequency offset in the digital domain comprises:
   determining a digital frequency shift at a periodic sampling interval based on the fine frequency offset; and
   mixing, using a digital mixer, the ranging signal with the digital frequency shift at the periodic sampling interval to generate the first signal.

6. The method of claim 1, wherein generating the first signal by shifting the ranging signal with the fine frequency offset in the digital domain comprises:
   determining a phase rotation at a periodic sampling interval based on the fine frequency offset; and
   rotating, using a coordinate rotation digital computer (CORDIC), the ranging signal with the phase rotation at the periodic sampling interval to generate the first signal.

7. The method of claim 1, further comprising:
   measuring the FSKE associated with a plurality of channels of the first device;
   storing the FSKE associated with the plurality of channels in a table; and
   determining, by the first device, the coarse frequency offset and the fine frequency offset for the target channel based on the table.

8. The method of claim 7, wherein storing the FSKE associated with the plurality of channels in the table comprises:
   determining a common term shared by the FSKE associated with the plurality of channels;

removing the common term from the FSKE associated with the plurality of channels; and storing the FSKE associated with the plurality of channels with the common term removed to reduce a size of the table.

9. The method of claim 1, further comprising:

transmitting, by the first device, the ranging signal on the target frequency of the target channel to the second device without communicating to the second device the FSKE associated with the target channel of the first device.

10. The method of claim 1, wherein the ranging signal is a constant tone signal or a round-trip time of flight (RTT) packet used for ranging between the first device and the second device.

11. An apparatus comprising:

a transmitter including a radio frequency (RF) domain and a digital domain configured to transmit initiating ranging signals to a target device;

a receiver configured to receive reflecting ranging signals from the target device; and a processor configured to:
determine a target frequency of a target channel used for transmitting a ranging signal to the target device, wherein the target frequency compensates for a frequency systematic known error (FSKE) associated with the target channel of the apparatus;

wherein the transmitter is configured to:
generate the target frequency of the ranging signal by shifting a first signal with a coarse frequency offset in the RF domain; and
generate the first signal by shifting the ranging signal with a fine frequency offset in the digital domain, wherein the coarse frequency offset combines with the fine frequency offset to compensate the target frequency for the FSKE.

12. The apparatus of claim 11, wherein the processor is further configured to:
determine the coarse frequency offset and the fine frequency offset based on the FSKE associated with the target channel of the apparatus.

13. The apparatus of claim 11, wherein to generating the target frequency by shifting the first signal with the coarse frequency offset in the RF domain, the processor is configured to:
program a phase locked loop (PLL) in the RF domain to generate the coarse frequency offset, wherein a frequency resolution of the PLL yields a frequency error in the coarse frequency offset that fails to fully compensate the target frequency for the FSKE.

14. The apparatus of claim 13, wherein the fine frequency offset in the digital domain compensates for the frequency error in the coarse frequency offset in the RF domain to fully compensate the target frequency for the FSKE.

15. The apparatus of claim 11, wherein to generate the first signal by shifting the ranging signal with the fine frequency offset in the digital domain, the processor is configured to:
determine a digital frequency shift at a periodic sampling interval based on the fine frequency offset; and
program a digital mixer with the digital frequency shift to enable the digital mixer to mix the ranging signal with the digital frequency shift at the periodic sampling interval to generate the first signal.

16. The apparatus of claim 11, wherein to generate the first signal by shifting the ranging signal with the fine frequency offset in the digital domain, the processor is configured to:
determine a phase rotation at a periodic sampling interval based on the fine frequency offset; and
program a coordinate rotation digital computer (CORDIC) with the phase rotation to enable the CORDIC to rotate the ranging signal with the phase rotation at the periodic sampling interval to generate the first signal.

17. The apparatus of claim 11, wherein the processor is further configured to:
measure the FSKE associated with a plurality of channels of the apparatus;
store the FSKE associated with the plurality of channels in a table; and
determine the coarse frequency offset and the fine frequency offset for the target channel based on the table.

18. The apparatus of claim 17, wherein to store the FSKE associated with the plurality of channels in the table, the processor is configured to:
determine a common term shared by the FSKE associated with the plurality of channels;
remove the common term from the FSKE associated with the plurality of channels; and
store the FSKE associated with the plurality of channels with the common term removed to reduce a size of the table.

19. The apparatus of claim 11, wherein the transmitter is further configured to:
transmit the ranging signal on the target frequency of the target channel to the target device without communicating to the target device the FSKE associated with the target channel of the apparatus.

20. A system comprising:

a host device;

an antenna;

a ranging device configured to exchange ranging signals with a target device, the ranging device includes:
a transmitter including a radio frequency (RF) domain and a digital domain configured to transmit initiating ranging signals to the target device through the antenna;
a receiver configured to receive reflecting ranging signals from the target device through the antenna; and
a processor configured to:
determine a target frequency of a target channel used for transmitting a ranging signal to the target device, wherein the target frequency compensates for a frequency systematic known error (FSKE) associated with the target channel of the ranging device;
wherein the transmitter is configured to:
generate the target frequency of the ranging signal by shifting a first signal with a coarse frequency offset in the RF domain; and
generate the first signal by shifting the ranging signal with a fine frequency offset in the digital domain, wherein the coarse frequency offset combines with the fine frequency offset to compensate the target frequency for the FSKE.

* * * * *